(12) United States Patent
Watanabe

(10) Patent No.: US 7,488,064 B2
(45) Date of Patent: Feb. 10, 2009

(54) INK JET RECORDING METHOD, PIGMENT DISPERSION AND ACTINIC RADIATION CURABLE TYPE INK JET INK COMPOSITION

(75) Inventor: Shinya Watanabe, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 135 days.

(21) Appl. No.: 11/727,289

(22) Filed: Mar. 26, 2007

(65) Prior Publication Data

US 2007/0165072 A1    Jul. 19, 2007

Related U.S. Application Data

(62) Division of application No. 10/918,733, filed on Aug. 16, 2004, now abandoned.

(30) Foreign Application Priority Data

Aug. 20, 2003  (JP) .............................. 2003-296175

(51) Int. Cl.
*C09D 11/00*  (2006.01)
(52) U.S. Cl. ................ 347/100; 106/31.13; 106/31.28; 106/31.6; 523/160; 523/161
(58) Field of Classification Search ................ 347/100; 106/31.13, 31.28, 31.69; 523/160, 161
See application file for complete search history.

(56) References Cited

U.S. PATENT DOCUMENTS

| | | | |
|---|---|---|---|
| 4,287,228 | A | 9/1981 | Schlesinger |
| 4,478,643 | A | 10/1984 | Kuwahara et al. |
| 5,178,996 | A | 1/1993 | Kobayashi et al. |
| 5,641,346 | A | 6/1997 | Mantell et al. |
| 5,674,922 | A | 10/1997 | Igarashi et al. |
| 5,952,401 | A | 9/1999 | Kimura et al. |
| 6,040,040 | A | 3/2000 | Rainbow |
| 6,166,100 | A | 12/2000 | Hiwara et al. |
| 6,232,361 | B1 | 5/2001 | Laksin et al. |
| 6,451,873 | B1 | 9/2002 | Stone et al. |
| 6,489,375 | B2 | 12/2002 | Stone et al. |
| 2002/0040073 | A1 | 4/2002 | Stone et al. |
| 2003/0207204 | A1 | 11/2003 | Sugasaki et al. |
| 2007/0191508 | A1* | 8/2007 | Nakagawa et al. .......... 523/160 |

FOREIGN PATENT DOCUMENTS

| | | |
|---|---|---|
| JP | 2005-097557 | 4/2005 |
| WO | WO/00/01777 | 1/2000 |

* cited by examiner

*Primary Examiner*—Manish S Shah
*Assistant Examiner*—Laura E Martin
(74) *Attorney, Agent, or Firm*—Finnegan, Henderson, Farabow, Garrett & Dunner, L.L.P.

(57) ABSTRACT

Disclosed is an ink jet recording method by ejecting microscopic ink droplets, and curing the ink via actinic radiation. The ink contains pigment dispersion including photopolymerizable compounds and pigments, hydrophilicity δm of the surface of pigments incorporated therein being at most 22 $cal^{1/2} \cdot cm^{-1/2}$.

29 Claims, No Drawings

INK JET RECORDING METHOD, PIGMENT DISPERSION AND ACTINIC RADIATION CURABLE TYPE INK JET INK COMPOSITION

This is a divisional application of U.S. patent application Ser. No. 10/918,733, filed on Aug. 16, 2004.

This application is based on Japanese Patent Application No. 2003-296175 filed on Aug. 20, 2003, in Japanese Patent Office, the entire content of which is hereby incorporated by reference.

BACKGROUND OF THE INVENTION

The present invention relates to a novel pigment dispersion and an actinic radiation curable type ink jet ink composition, and in more detail to a pigment dispersion in which dispersibility of pigments and dispersion stability are improved, and an actinic radiation curable type ink jet ink using the same.

In recent years, ink jet recording systems have been applied to various printing fields such as photography, various kinds of printings, marking, and special printing such as color filters, since they make it possible to simply and conveniently prepare images at low cost. Specifically, by employing recording apparatuses which eject microscopic ink droplets, and control them, inks which result in improved range of color reproduction, as well as exhibit improved durability and ejection suitability, and special paper sheets of which ink absorbability, color forming properties of colorants and surface glossiness are markedly improved, it has become possible to result in image quality comparable to conventional silver salt photography. Improvements in image quality of the current ink jet recording systems have been achieved only by the integration of ink jet recording apparatuses, inks, and special kinds of paper.

However, in ink jet systems which necessitate special papers, problems surface in which recording media are limited and the cost of the recording media increases. Consequently, many trials have been made in which recording is performed on media to be transferred which are different from special paper sheets, employing the ink jet systems. Listed as specific examples are a phase variation ink jet system which employs a wax ink which is in the form of a solid at room temperature, a solvent based ink jet system which employs ink comprised of rapid drying organic solvents as a major component, and an ultraviolet radiation curable type ink jet system in which crosslinking undergoes employing ultraviolet radiation after printing. However, at present, various problems occur in these systems.

For example, in the phase variation ink jet system, neither sufficient image strength nor fixability is achieved due to use of wax as ink. Further, in the solvent based ink jet system, the following problems occur: unpleasant odors (being an environmental problem) are generated due to high volatility of the ink, and heads are clogged due to dried ink. Further, since ink penetration properties differ depending on the employed recording media, bleeding as well as drying is not stabilized, whereby ink bleeding tends to result.

On the other hand, in recent years, an ultraviolet radiation curable type ink jet system has received favorable attention due to its relatively low unpleasant odor, rapid drying property which makes it possible to carry out recording on non-ink absorptive recording media, compared to the solvent based ink jet systems. For example, Japanese Patent Publication No. 5-54667, Japanese Patent Publication Open to Public Inspection No. 6-200204, and Japanese Patent Publication Open to Public Inspection (under PCT Application) No. 2000-504778 disclose ultraviolet radiation curable type ink jet inks. In any of these methods, employed are acryl monomers as a polymerizable compound. However, in view of a decrease in viscosity to achieve stable ink ejection, an increase in photospeed, and closer adhesion to recording media, selected as polymerizable monomers which are employed in ink are those which irritate skin or induce allergic reactions. Consequently, they are highly toxic to customers and operators. Further, Japanese Patent Publication Open to Public Inspection (under PCT Application) No. 2000-504778 discloses a method in which either alkoxyacrylates or polyalkoxyacrylates, which exhibit relatively high safety standards, are incorporated in an amount of 80-95 percent by weight. However, a structure, in which either monofunctional or multifunctional monomers are incorporated in an amount of a minimum of 80 percent by weight, results in problems in which sufficient adhesion to recording media is not achieved, ink bleeding occurs, and unpleasant odor due to unreacted monomers is generated with respect to a wide range of recording media, such as highly permeable recording media or highly wettable and easily bleeding polyethylene terephthalate films.

Assumed as factors in which sufficient photocuring speed is not achieved are bleeding of printed images before the ink is cured and penetration of the ink into porous recording medium. In addition, the aforesaid penetration has enlarged the problem of the residual unpleasant odor due to the unreacted monomers. Considered as methods which aid in an increase in photocuring speed are means in which the intensity of a radiation source is increased and exposure time is increased. However, all these methods have resulted in an inevitable increase in cost of the integral apparatuses.

As noted above, the radiation curable type ink jet system, which employs ultraviolet radiation as one means of radiation, exhibits excellent features compared to other ink jet systems. However, in view of safety and apparatus cost, the present radiation curable type ink jet system is inferior to the water-based ink jet system. Consequently, urgently demanded is development of problem-solving methods.

Listed as means to overcome the above problems is an ultraviolet radiation curable type ink jet system employing compounds which are cured via cationic polymerization. For example, Japanese Patent Publication Open to Public Inspection No. 8-143806 discloses an actinic radiation curable type ink composition employing an oxetane ring-containing compound (hereinafter referred to as an oxetane compound). Oxetane compounds neither irritate skin nor induce allergic reactions. Further, the oxetane compounds exhibit features in that polymerization is not inhibited due to the presence of oxygen in the same manner as radical polymerization of acryl monomers, and it is also possible to cure the ink employing a radiation source at a relatively low output. However, problems still exist in which pigment dispersibility and dispersion stability are inferior.

SUMMARY OF THE INVENTION

According to one embodiment of the present invention, a pigment dispersion is provided, the dispersion includes photopolymerizable compounds and pigments. The hydrophilicity δm of the surface of pigments incorporated therein is at most $22 \text{ cal}^{1/2} \text{ cm}^{-1/2}$, which is specifically determined based on the following steps, (1) pigments are floated on a definite amount of water (B ml), and while stirring, acetone is dripped through a burette of which tip is placed in the water so that acetone is not directly poured onto the pigment, (2) using amount of acetone (A ml) dripped to sink the pigment, δm is calculated based on the formula below.

$$\delta m = (A \cdot \delta_{acetone} + B \cdot \delta_{water})/(A+B)$$

$$\delta_{acetone} = 9.75 (cal^{1/2} \cdot cm^{-1/2})$$

$$\delta_{water} = 23.43 (cal^{1/2} \cdot cm^{-1/2})$$

In another embodiment of the present invention, an actinic radiation curable type ink jet ink composition includes photopolymerizable compounds, photopolymerization initiators, and pigments. The hydrophilicity δm of the surface of pigments incorporated therein is at most 22 $cal^{1/2}$ $cm^{-1/2}$ also.

DETAILED DESCRIPTION OF THE PREFERRED EMBODIMENT

The best embodiment to practice the present invention will now be detailed. However, the present invention is not limited thereto.

In the present invention, a pigment dispersion comprising photopolymerizable compounds as well as pigments, or an actinic radiation curable type ink jet ink composition comprising photopolymerizable compounds, photopolymerization initiators, and pigments is characterized in that hydrophilicity δm of the surface of pigments incorporated therein is at most 22.

Hydrophilicity δm of the surface of pigments, as described in the present invention refers to surface hydrophilicity δm which is determined by the titration method described in Shikizai (Colorants), 73[3], 136 (2000), and is specifically determined based on the following steps.

Pigments are floated on a definite amount of water(B ml), and while stirring, acetone is dripped through a burette of which tip is placed in the water so that acetone is not directly poured onto the pigment. The amount of acetone (A ml) is recorded which is dripped to sink the pigment, and δm is calculated based on the formula below.

$$\delta m = (A \cdot \delta_{acetone} + B \cdot \delta_{water})/(A+B)$$

$$\delta_{acetone} = 9.75 (cal^{1/2} \cdot cm^{-1/2})$$

$$\delta_{water} = 23.43 (cal^{1/2} \cdot cm^{-1/2})$$

The present invention is characterized in that surface hydrophilicity δm is at most 22 $cal^{1/2} \cdot cm^{-1/2}$. The aforesaid hydrophilicity δm is preferably at most 21.5 $cal^{1/2} \cdot cm^{-1/2}$, and is more preferably 10.0-21.5 $cal^{1/2} \cdot cm^{-1/2}$. When δm exceeds 22 $cal^{1/2} \cdot cm^{-1/2}$, the resulting dispersibility is markedly degraded.

In the present invention, it is possible to set the hydrophilicity of pigment surface at 22 $cal^{1/2} \cdot cm^{-1/2}$ or less specified by the present invention, employing individually or in combinations a method(s) selected from conventional surface treatment methods known in the art, such as a pigment derivative treatment, a rosin treatment, a polymer treatment, a surface graft treatment, or a plasma treatment.

Pigments usable in the present invention are listed below.

Employed may be those described below according to purposes. Red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257; Pigment Violet 3, 19, 23, 29, 30, 37, 50, and 88, and Pigment Orange 13, 16, 20, and 36. Blue or cyan pigments include Pigment Blue 15, 15:1, 15:2, 15:3, 15:4, 15:6, 17-1, 22, 27, 28, 29, 36, and 60. Yellow pigments include Pigment Yellow 1, 3, 12, 13, 14, 17, 34, 35, 37, 55, 74, 81, 83, 93, 94, 95, 97, 108, 109, 110, 120, 128, 137, 138, 139, 151, 153, 154, 155, 157, 166, 167, 168, 180, 185, and 193. Black pigments include Pigment Black. 7, 26 and 28; and white pigments include Pigment White 6, 18 and 21.

It is possible to disperse the above-mentioned pigments by employing, for example, a ball mill, a sand mill, an attritor, a roller mill, an agitator, a Henschel mixer, a colloid mill, an ultrasonic homogenizer, a pearl mill, a wet type jet mill, and a paint shaker. When pigments are dispersed, it is preferable that dispersing agents are added. Preferably employed as dispersing agents are polymer dispersing agents. Listed as polymer dispersing agents are the Solsperse Series, available from Avecia, the AJISPER Series available from Ajinomoto Fine Techno Co., the DISPERBYK Series available from BYK Chemie Co., and the DISPERON Series and the PLAAD Series both available from Kusumoto Chemicals, Ltd. Further, employed as dispersing aids may be synergists corresponding to each type of the pigments. The added amount of such dispersing agents and dispersing aids is preferably 1-60 parts by weight with respect to 100 parts by weight of the pigments. A dispersion medium may be comprised of solvents or polymerizable compounds. However, in the actinic radiation curable type ink employed in the present invention, it is preferable that no solvents are used so that ink undergoes reaction and curing immediately after deposition. When solvents remain in cured images, problems of degradation of image durability and VOC of remaining solvents occur. Consequently, it is preferable that the dispersion media are not solvents but polymerizable compounds. Of these, in view of dispersion suitability, it is preferable to select monomers which exhibit the lowest viscosity.

It is preferable that pigments are dispersed in such a manner that the average diameter of pigment particles is at most 200 nm but is more preferably at most 150 nm. Further, pigments, dispersing agents, and dispersion media are selected and dispersing conditions and filtering conditions are suitably set so that the maximum particle diameter is in 0.3-10 μm, and is more preferably 0.3-3 μm. In the ink compositions according to the present invention, the concentration of pigments is preferably 1-10 percent by weight with respect to the total ink.

Photopolymerizable compounds according to the present invention will now be described.

One of the features of the pigment dispersion or actinic radiation curable type ink jet ink compositions of the present invention is that photopolymerizable compounds, especially photopolymerizable compounds containing an oxetane ring are incorporated. Employed as oxetane compounds may be any of those known in the art, which are disclosed in Japanese Patent Publication Open to Public Inspection Nos. 2001-220526 and 2001-310937.

In the present invention! when compounds having at least 5 oxetane rings are used, in some cases, the viscosity of the resulting ink composition increases resulting in difficulty in handling, and the glass transition temperature of the ink composition also increases whereby the adherence of the resulting cured composition becomes insufficient. Compounds having oxetane ring(s) employed in the present invention are preferably those having 1-4 oxetane rings.

Specific examples of compounds having oxetane ring(s) according to the present invention will now be described; however, the present invention is not limited thereto.

Listed as one example of compounds having one oxetane ring is the compound represented by General Formula (A) described below:

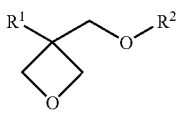
General Formula (A)

In General Formula (A), $R^1$ represents a hydrogen atom, an alkyl group having 1-6 carbon atoms such as a methyl group, an ethyl group, a propyl group, or a butyl group, an allyl group, an aryl group, a furyl group, or a thienyl group. $R^2$ represents an alkyl group having 1-6 carbon atoms such as a methyl group, an ethyl group, a propyl group, or a butyl group; an alkenyl group having 2-6 carbon atoms such as a 1-propenyl group, a 2-propenyl group, a 2-methyl-1-propenyl group, a 2-methyl-2-propenyl group, a 1-butenyl group, a 2-butenyl group, or a 3-butemnyl group; an aromatic ring-containing group such as a phenyl group, a benzyl group, a fluorobenzyl group, a methoxybenzyl group, or a phenoxyethyl group; an alkylcarbonyl group having 2-6 carbon atoms such as an ethylcarbonyl group, a propylcarbonyl group, or a butylcarbonyl group; an alkoxycarbonyl group having 2-6 carbon atoms such as an ethoxycarbonyl group, a propoxycarbonyl group, or a butoxycarbonyl group; or an N-alkylcarbamoyl group having 2-6 carbon atoms such as an ethylcarbamoyl group, a propylcarbamoyl group, a butylcarbamoyl group, or a pentylcarbamoyl group.

Listed as one example of compounds having two oxetane rings is the compound represented by General Formula (B) described below:

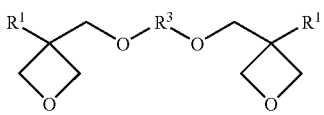
General Formula (B)

In General Formula (B), $R^1$ is the same group as defined for the aforesaid General Formula (A). $R^2$ is, for example, a straight chain or branched alkylene group such as an ethylene group, a propylene group, or a butylene group; a straight chain or branched poly(alkyleneoxy) group such as a poly(ethyleneoxy) group or a poly(propyleneoxy) group; a straight chain or branched unsaturated hydrocarbon group such as a propenylene group, a methylpropylene group, or a butenylene group; an alkylene group containing a carbonyl group; an alkylene group containing a carboxyl group; and an alkylene group containing a carbamoyl group. Further, listed as $R^3$ may be a multivalent group selected from the group represented by the following General Formulas (C), (D), and (E).

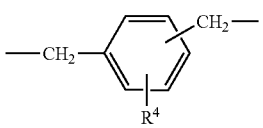
General Formula (C)

In General Formula (C), $R^4$ represents a hydrogen atom, an alkyl group having 1-4 carbon atoms such as a methyl group, an ethyl group, a propyl group, or a butyl group, an alkoxy group having 1-4 carbon atoms such as a methoxy group, an ethoxy group, a propoxy group, or a butoxy group, a halogen atom such as a chlorine atom or a bromine atom, a nitro group, a cyano group, a mercapto group, a lower alkylcarboxyl group, a carboxyl group, or a carbamoyl group.

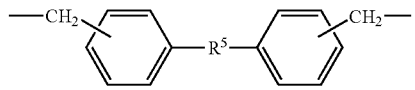
General Formula (D)

In General Formula (D), $R^5$ represents an oxygen atom, a sulfur atom, a methylene group, NH, SO, $SO_2$, $C(CF_3)_2$, or $(CH_3)_2$.

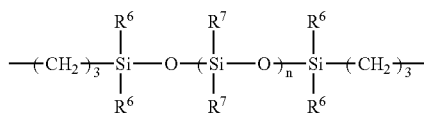
General Formula (E)

In General Formula (E), $R^6$ represents an alkyl group having 1-4 carbon atoms such as a methyl group, an ethyl group, a propyl group, or a butyl group or an aryl group, and n represents an integer of 0-200. $R^7$ represents an alkyl group having 1-4 carbon atoms such as a methyl group, an ethyl group, a propyl group, or a butyl group, or an aryl group. Listed as $R^7$ may be a group selected from the groups represented by General Formula (F) below.

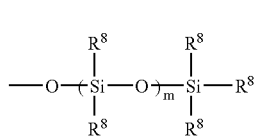
General Formula (F)

In General Formula (F), $R^8$ represents an alkyl group having 1-4 carbon atoms such as a methyl group, an ethyl group, a propyl group, or a butyl group or an aryl group, while m represents an integer of 0-100.

Listed as specific examples having two oxetane rings are those described below.

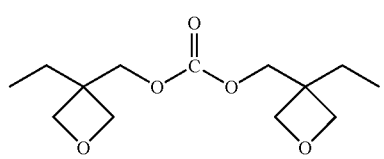
Exemplified Compound 1

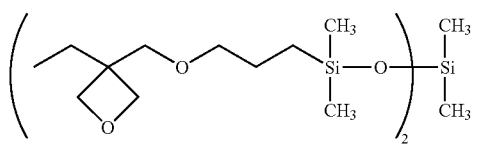
Exemplified Compound 2

Exemplified Compound 1 is one in which, in aforesaid General Formula (B), $R^1$ is an ethyl group and $R^3$ is a carboxyl group. Further, Exemplified Compound 2 is one in which, in aforesaid General Formula (B), $R^1$ is an ethyl group and $R^3$ is a group represented by aforesaid General Formula (E) in which each of $R^6$ and $R^7$ is a methyl group, while n is 1.

Listed as preferred compounds having two oxetane rings, other than those described above, are the compounds represented by General Formula (G) below. In General Formula (G), $R^1$ is as defined for $R^1$ in aforesaid General Formula (A).

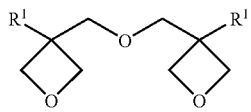

General Formula (G)

Listed as one example of compounds having 3-4 oxetane rings is the compound represented by General Formula (H) below.

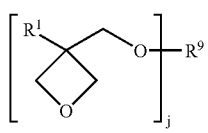

General Formula (H)

In General Formula (H), $R^1$ is as defined for $R^1$ in aforesaid General Formula (A). Listed as $R^9$ are, for example, a branched alkylene group having 1-12 carbon atoms such as those represented by A-C below, a branched poly(alkyleneoxy) group represented by D below, or a branched polysiloxy group represented by E below, while j is 3 or 4.

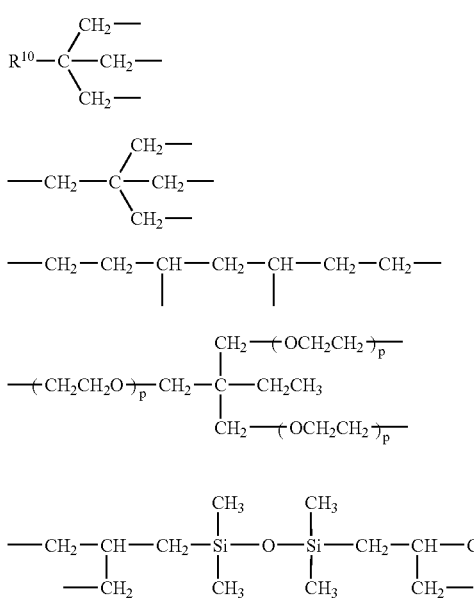

In aforesaid A, $R^{10}$ is a lower alkyl group such as a methyl group, an ethyl group, or a propyl group. Further, in aforesaid D, p is an integer of 1-10.

Listed as one example of compounds having 3-4 oxetane rings is Exemplified Compound 3.

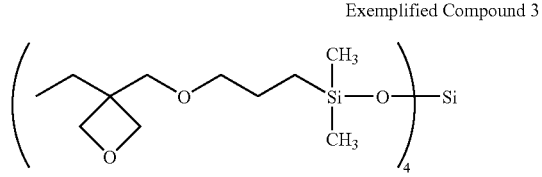

Exemplified Compound 3

In addition, listed as examples of compounds having 1-4 oxetane rings, other than those described above, are compounds represented by General Formula (I) below.

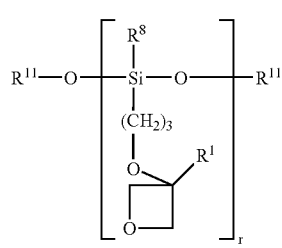

General Formula (I)

In General Formula (I), $R^8$ is as defined for $R^8$ in aforesaid General Formula (F). $R^{11}$ is an alkyl group having 1-4 carbon atoms, such as a methyl group, an ethyl group, a propyl group, or a butyl group, and r is 1-4.

Preferred specific examples of oxetane compounds employed in the present invention include the compounds shown below.

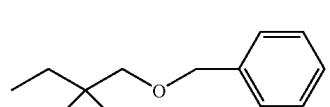

Exemplified Compound 4

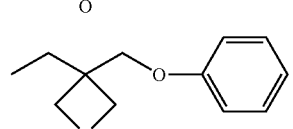

Exemplified Compound 5

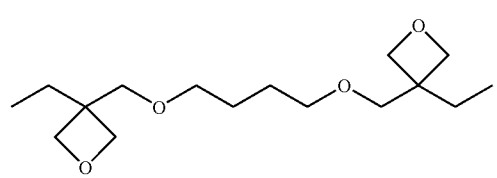

Exemplified Compound 6

Production methods of each of the aforesaid compounds, having oxetane rings, are not particularly limited, and are produced employing conventional methods. An example includes a synthesis method of the oxetane ring from diol which is disclosed in D. B. Pattison, J. Am. Chem. Soc., 3455, 79 (1957). Further, listed are compounds having 2-4 oxetane rings and a high molecular weight such as about 1,000-about 5,000. Listed as specific examples of these compounds are the following compounds.

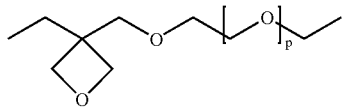

p: 20 to 200

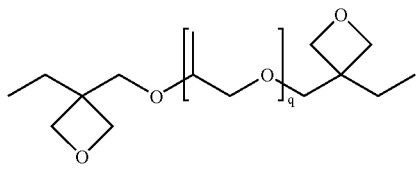

q: 15 to 100

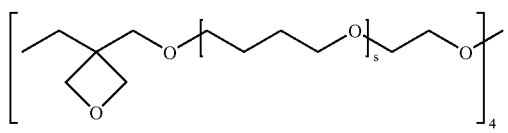

s: 20 to 200

Further, it is possible to use 2-substituted oxetane compounds in the pigment dispersion and the actinic radiation curable type ink jet ink composition of the present invention. Listed as 2-substituted oxetane compounds usable in the present invention are compounds having one or more oxetane rings in the molecule represented by General Formula (1) below.

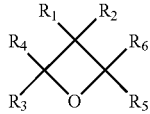

General Formula (1)

wherein $R_1$-$R_6$ each represent a hydrogen atom or a univalent or divalent organic group, and at least one of $R_3$-$R_6$ is not a hydrogen atom.

Listed as compounds which have one oxetane ring in their molecule may be the compounds represented by General Formulas (2)-(5) below.

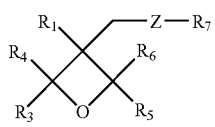

General Formula (2)

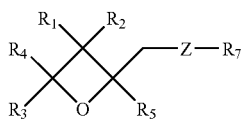

General Formula (3)

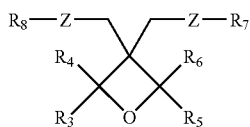

General Formula (4)

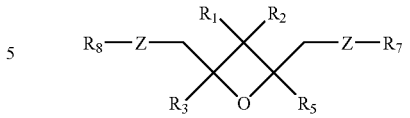

General Formula (5)

In General Formulas (2)-(5), Z is independently an oxygen or sulfur atom, or a divalent hydrocarbon group which may contain an oxygen or sulfur atom in the main chain.

$R_1$-$R_6$ each independently represent a hydrogen atom, a fluorine atom, an alkyl group having 1-6 carbon atoms, such as a methyl group, an ethyl group, a propyl group, or a butyl group, a fluoroalkyl group having 1-6 carbon atoms, an allyl group, an aryl group, or a thienyl group.

$R_7$ and $R_8$ each independently represent an alkyl group having 1-6 carbon atoms, such as a methyl group, an ethyl group, a propyl group, or a butyl group; an alkenyl group having 2-6 carbon atoms, such as a 1-propenyl group, a 2-propenyl group, a 2-methyl-1-propenyl group, a 2-methyl-2-propenyl group, a 1-butenyl group, a 2-butenyl-group, or a 3-butemnyl group; an aryl group such as a phenyl group, a benzyl group, a fluorobenzyl group, a methoxybenzyl group, or a phenoxyethyl group; an alkylcarbonyl group having 1-6 carbon atoms such a propylcarbonyl group, a butylcarbonyl group, or pentylcarbonyl group; an alkoxycarbonyl group having 1-6 carbon atoms such as an ethoxycarbonyl group, a propoxycarbonyl group, or a butoxycarbonyl group; or an N-alkoxycarbamoyl group having 1-6 carbon atoms, such as an ethoxycarbamoyl group, a propoxylcarbamoyl group, or a butylpentylcarbamoyl group.

Further, in General Formulas (2)-(4), at least one of $R_3$-$R_6$ is not a hydrogen atom.

As oxetane ring containing compounds used in the present invention, it is preferable that in aforesaid General Formulas (2)-(5), $R_1$ is a lower alkyl group, especially an ethyl group; $R_7$ and $R_8$ are propyl groups, butyl groups, phenyl groups, or benzyl groups; and Z is a hydrocarbon group containing neither an oxygen atom nor a sulfur atom.

Incidentally, listed as compounds having at least two oxetane rings in the molecule may be the compounds represented by General Formula (6) or (7) below.

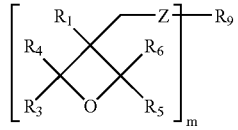

General Formula (6)

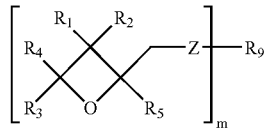

General Formula (7)

In General Formulas (6) and (7), m is 2, 3, or 4, and Z is independently an oxygen atom, a sulfur atom, or a divalent hydrocarbon group which may have an oxygen atom or a sulfur atom.

$R_1$-$R_6$ each independently represent a hydrogen atom, a fluorine atom, an alkyl group having 1-6 carbon atoms, such as a methyl group, ethyl group, a propyl group, or a butyl group, an allyl group, an aryl group, or a furyl group.

In General Formula (6), at least one of $R_3$-$R_6$ is not a hydrogen atom.

Further, $R_9$ is, for example, a straight chain or branched alkylene group having 1-12 carbon atoms, represented by General Formula (8) below, or a straight chain or branched poly(alkyleneoxy) group.

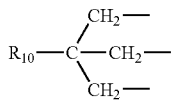
General Formula (8)

In General Formula (8), $R_{10}$ represents a lower alkyl group such as a methyl group, an ethyl group, or a propyl group.

$R_9$ is a multivalent group selected from the group of General Formulas (9), (11), and (12) below.

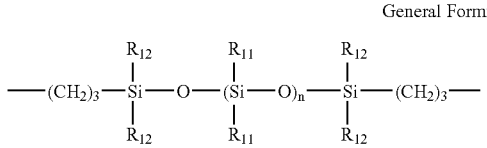
General Formula (9)

In General Formula (9), n represents an integer of 1-2,000, $R_{11}$ represents an alkyl group having 1-10 carbon atoms, such as a methyl group, an ethyl group, a propyl group, or a butyl group, as well as a group selected from the group comprised of General Formula (10) below. $R_{12}$ represents an alkyl group having 1-10 carbon atoms, such as a methyl, group, an ethyl group, a propyl group, or a butyl group.

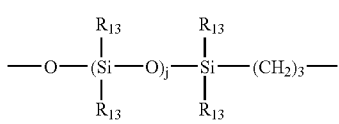
General Formula (10)

In General formula (10), j represents an integer of 1-100, and $R_{13}$ represents an alkyl group having 1-10 carbon atoms, such as a methyl group, an ethyl group, a propyl group, or a butyl group.

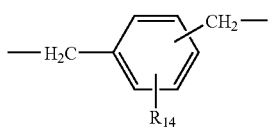
General Formula (11)

In General Formula (11), $R_{14}$ represents a hydrogen atom, an alkyl group having 1-10 carbon atoms, such as a methyl group, an ethyl group, a propyl group, or a butyl group, an alkoxy group having 1-10 carbon atoms, a halogen atom, a nitro group, a cyano group, a mercapto group, a lower alkylcarboxylate group, or a carboxyl group.

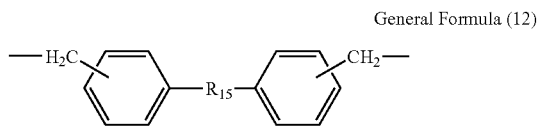
General Formula (12)

In General Formula (12), $R_{15}$ represents an oxygen atom, a sulfur atom, NH, SO, $SO_2$, $CH_2$, $C(CH_3)_2$ or $C(CF_3)_2$.

Preferred as oxetane compounds employed in the present invention are those in which in aforesaid General Formulas (6) and (7), $R_1$ is a lower alkyl group, especially an ethyl group, $R_9$ is a group in which in General Formula (11), $R_{14}$ is a hydrogen atom, a hexamethylene group, a group in which in General Formula (8), $R_{10}$ is an ethyl group, a group in which in General Formula (9), $R_{12}$ is a methyl group, and a group in which in General Formula (10), $R_{13}$ is a methyl group, and Z is a hydrocarbon group containing neither an oxygen atom nor a sulfur atom.

Further, listed as examples of compounds having a plurality of oxetane rings in the molecule are the compounds represented by General Formula (13).

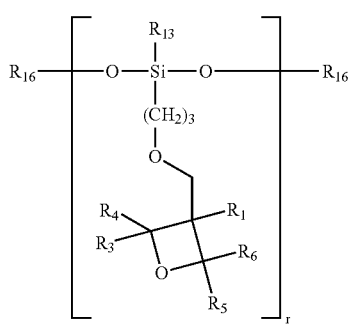
General Formula (13)

In General Formula (13), r is an integer of 25-300, $R_{16}$ is an alkyl group having 25-200 carbon atoms or a trialkylsilyl group. $R_1$-$R_6$ are each the same as those in General Formula (1), $R_{13}$ is the same as the one in General Formula (10), and at least one of $R_3$-$R_6$ is not a hydrogen atom.

It is possible to synthesize the compounds having oxetane ring(s) according to the present invention, in which at least position 2 is substituted, with reference to the publications described below.

(1) Hu Xianming and Richard M. Lellogg, Synthesis, 533-538, May (1995).
(2) A. O. Fitton, J. Hill, D. Ejane, and R. Miller, Synth. 12, 1140 (1987)
(3) Toshiro Imai and Shinya Nishida, Can. J. Chem. Vol. 59, 2503-2509 (1981)
(4) Nobujiro Shimizu, Shintaro Yamaoka, and Yuho Tsuno, Bull. Chem. Soc. Jpn., 56, 3853-3854 (1983)
(5) Walter Fisher and Cyril A. Grob, Helv. Chim. Acta., 61, 2336 (1978)
(6) Chem. Ber. 102, 1850 (1968)
(7) "Heterocyclic Compounds with Three- and Four-membered Rings", Part Two, Chapter IX, Interscience Publishers, John Wiley & Sons, New York (1964)
(8) Bull. Chem. Soc. Jpn., 61. 1653 (1988)
(9) Pure Appl. Chem., A29 (10), 915 (1992)
(10) Pure Appl. Chem., A30 (2 & amp; 3), 189 (1993)

(11) Japanese Patent Publication Open to Public Inspection No. 16804

(12) DE 1021858

Specific examples of compounds containing the oxetane ring, in which position 2 is substituted, are shown below as Exemplified Compounds 1-15. However, the present invention is not limited thereto.

Exemplified Compound 1: trans-3-tert-butyl-2-phenyloxetane

Exemplified Compound 2: 3,3,4,4-tetramethyl-2,2-dipenyloxetane

Exemplified Compound 3: di[3-ethyl(2-methoxy-3-oxetanyl)]methyl ether

Exemplified Compound 4: 1,4-bis(2,3,4,4-tetramethyl-3-ethyl-oxetanyl)butane

Exemplified Compound 5: 1,4-bis(3-methyl-3-ethyloxetanyl)butane

Exemplified Compound 6: di(3,4,4-trimethyl-3-ethyloxetanyl)methyl ether

Exemplified Compound 7: 3-(2-ethyl-hexylpxymethyl)-2,2,3,4-tetrametyloxetane

Exemplified Compound 8: 2-(2-ethyl-hexyloxy)-2,3,3,4,4-pentamethyl-oxetane

Exemplified Compound 9: 4,4'-bis[(2,4-dimethyl-3-ethyl-3-oxetanyl)methoxy]biphenyl Exemplified Compound 10: 1,7-bis(2,3,3,4,4-pentamethyl-oxetanyl)heptane Exemplified Compound 11: oxetanyl silsesquioxane Exemplified Compound 12: 2-methoxy-3,3-dimethyloxetane Exemplified Compound 13: 2,2,3,3-tetramethyloxatane Exemplified Compound 14: 2-(4-methoxyphenyl)-3,3-dimethyloxetane Exemplified Compound 15: di(2-(4-methoxyphenyl)-3-methyloxetane-3-il)ether.

Further, in the present invention, employed as photopolymerizable compounds may be any of the oxirane group-containing compounds (hereinafter referred to as epoxy compounds), as well as vinyl ether compounds known in the art.

Listed as epoxide compounds are aromatic epoxides as well as aliphatic epoxides.

Preferred as aromatic epoxides are di- or polyglycidyl ethers which are produced through the reaction of polyhydric phenol or alkylene oxide addition products thereof, with epichlorohydrin. For example, listed are bisphenol A, or di- or polyglycidyl ether of alkylene oxide addition products thereof, hydrogenated bisphenol A, or di- or polyglycidyl ethers of alkylene oxide addition product thereof, and novolac type epoxy resins. Herein, listed as alkylene oxides are ethylene oxide and propylene oxide.

It is possible to prepare alicyclic epoxides by epoxidizing compounds having at least one cycloalkane ring, such as a cyclohexane or cyclopentane ring, employing suitable oxidizing agents such as hydrogen peroxide or peracid. Either cyclohexane oxides or cyclopentane oxides are preferred.

Preferred as aliphatic epoxides are aliphatic polyhydric alcohols or di- or polyglycidyl ethers of alkylene oxide addition products thereof. Listed as representative examples thereof are glycidyl ethers of alkylene glycol such as diglycidyl ether of ethylene glycol, diglycidyl ether of propylene glycol, or diglycidyl ethers of 1,6-hexandiol; polyglycidyl ethers of polyhydric alcohols such as di- or triglycidyl ethers of glycerin or alkylene oxide addition products thereof; and diglycidyl ethers of polyalkylene glycol such as diglycidyl ethers of polyethylene glycol of alkylene oxide addition products thereof. Herein, listed as alkylene oxides are ethylene oxide and propylene oxide.

Of these epoxides, in view of rapid curing properties, preferred are aromatic epoxides as well as alicyclic epoxides, and alicyclic epoxides are particularly preferred. In the present invention, the aforesaid epoxies may be employed individually or in suitable combinations of at least two types.

Further, listed as vinyl ether compounds are, for example, di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, or trimethylolpropane trivinyl ether, and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, or octadecyl vinyl ether.

Of these vinyl ether compounds, in view of curability, adhesion property, and surface strength, di- or trivinyl ether compounds are preferred, and divinyl ether compounds are particularly preferred. In the present invention, the aforesaid vinyl ether compounds may be employed individually or in suitable combinations of at least two types.

The actinic radiation curable type ink jet ink composition of the present invention comprises photopolymerization initiators. Listed as photopolymerization initiators may be aromatic onium salts. Listed as such aromatic onium salts may be salts of Group Va elements in the periodic-table such as phosphonium salts (e.g., hexafluorophosphoric acid triphenylphenacylphosphonium), salts of Group VI elements such as sulfonium salts (e.g., tetrafluoroboric acid triphenylsulfonium, hexafluorophosphoric acid triphenylsulfonium, hexafluorophosphoric acid tris(4-thiomethjoxyphenyl), sulfonium, and hexafluoroantimonic acid triphenylsulfonium), and salts of Group VIIa elements such as iodonium salts (e.g., diphenyliodonium chloride). U.S. Pat. Nos. 4,058,401, 4,069,055, 4,101,513, and 4,161,478 detail that such aromatic onium salts are employed as a cationic polymerization initiator during polymerization of epoxy compounds.

Listed as preferred photopolymerization initiators are sulfonium salts of Group VIa elements. Of these, in view of ultraviolet radiation curability as well as storage stability of ultraviolet radiation curable compositions, hexafluoroantimonic acid triarylsulfonium is preferred. Further, it is possible to use any of the prior art photopolymerization initiators described on pages 39-56 of Hotoporima Hando Bukku (Photopolymer Handbook) (edited by Photopolymer Konwa Kai, published by Kogyo Chosa Kai, 1989) and compounds described in Japanese Patent Publication Open to Public Inspection Nos. 64-13142 and 2-4804.

Further, it is preferable to use, as a photopolymerization initiator, sulfonium salts which generate no benzene by exposure to actinic radiation. "Generate no benzene by exposure to actinic radiation", as described herein, means that no substantial amount of benzene is generated, and specifically refers to the following case. A 15 µm thick image of an area of approximately 100 m$^2$ is printed employing an ink containing onium salts (being photolytically acid generating agents) in an amount of 5 percent by weight in the ink composition, and the resulting ink layer, maintained at 30° C., is exposed to actinic radiation in an amount which completely decomposes the photolytically acid generating agents and the amount of generated benzene was determined. In such a test, "generate no benzene by exposure to actinic radiation" means that no benzene was generated, or the amount of generated benzene was negligible, being at most 5 μg. Preferred as the aforesaid onium slats are sulfonium salts or iodonium salts. Those having a substituent on the benzene ring, which bonds to $S^+$ or $I^+$, satisfy the above conditions.

Preferred as the aforesaid sulfonium salts are sulfonium salt compounds represented by General Formulas (1)-(4), and those having a substituent on the benzene ring, which bonds to $S^+$, satisfy the above conditions.

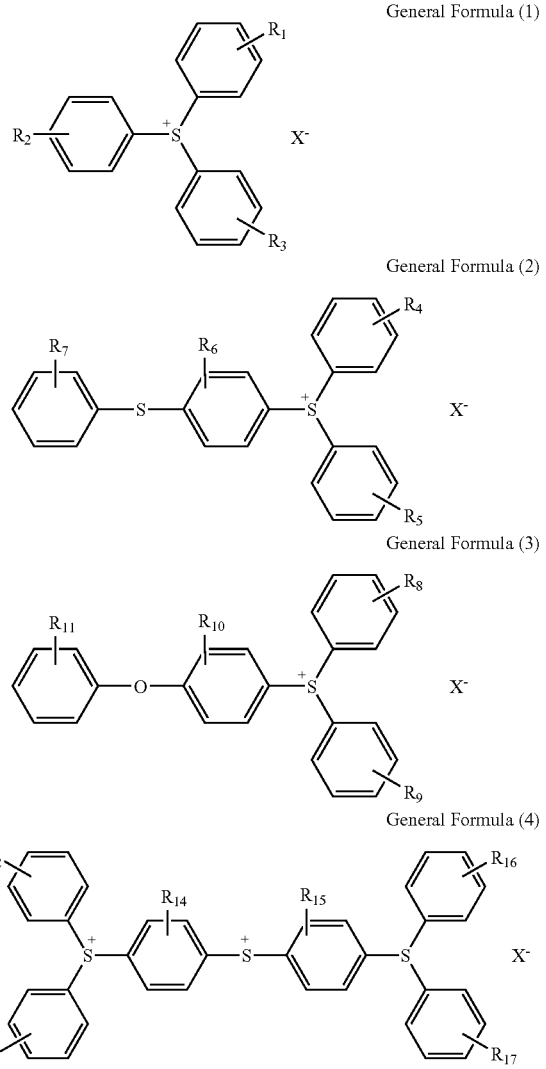

In above General Formulas (1)-(4), $R_1$-$R_{17}$ each represent a hydrogen atom or a substituent. None of $R_1$-$R_3$ simultaneously represent a hydrogen atom, none of $R_4$-$R_7$ simultaneously represent a hydrogen atom, and none of $R_{12}$-$R_{17}$ simultaneously represent a hydrogen atom.

Preferably listed as substituents represented by $R_1$-$R_{17}$ may be an alkyl group such as a methyl group, an ethyl group, a propyl group, an isopropyl group, a butyl group, an isobutyl group, a t-butyl group, a pentyl group, or an hexyl group; an alkoxy group such as a methoxy group, an ethoxy group, a propoxy group, a butoxy group, a hexyloxy group, a decyloxy group, or a dodecyloxy group; a carbonyl group such as an acetoxy group, a propionyloxy group, a decylcarbonyloxy group, a dodecylcarbonyloxy group, a methoxycarbonyl group, an ethoxycarbonyl group, or a benzoyloxy group; a phenylthio group; a halogen atom such as fluorine, chlorine, bromine, or iodine; a cyano group; a nitro group; and a hydroxyl group.

X represents a non-nucleophilic anionic residual group. Listed as examples of such may be a halogen atom such as F, Cl, Br, and I, $B(C_6F_5)$, $R_{18}COO$, $R_{19}SO_3$, $SbF_6$, $AsF_6$, $PF_6$, or $BF_4$, wherein $R_{18}$ and $R_{19}$ each represent an alkyl group such as a methyl group, an ethyl group, a propyl group, or a butyl group, a halogen atom such as fluorine, chlorine, bromine, or iodine, a nitro group, a cyano group, an alkyl group which may be substituted with an alkoxy group such as a methoxy group or an ethoxy group, or a phenyl group. Of these, in view of safety, $B(C_6F_5)_4$ and $PF_6$ are preferred.

It is possible to readily synthesize the aforesaid compounds employing methods known in the art in the same manner as for photolytically acid generating agents, described in THE CHEMICAL SOCIETY OF JAPAN, Vol. 71 No. 11, 1998, and "Imezingu yo Yuuki Zairyo (Organic Materials for Imaging)", edited by Yuuki Electronics Zairyo Kenkyu Kai, published by Bunshin Shuppan (1993).

In the present invention, it is particularly preferable that the sulfonium salt represented by aforesaid General Formulas (1)-(4) is at least one of the sulfonium salts selected from General Formulas (5)-(13), described below. X represents a non-nucleophilic anionic residual group in the same manner as above.

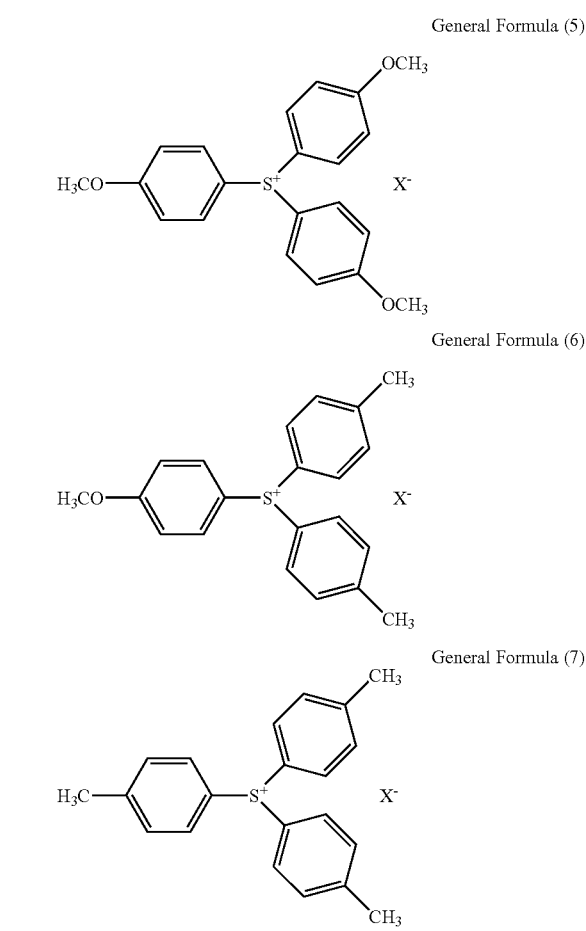

-continued

General Formula (8)

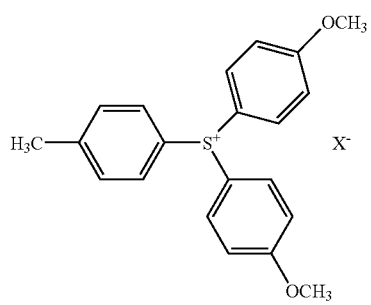

General Formula (9)

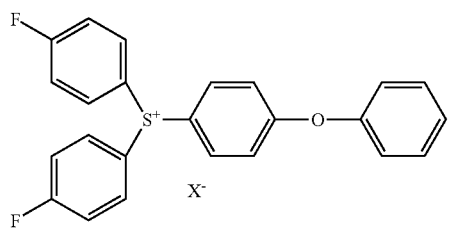

General Formula (10)

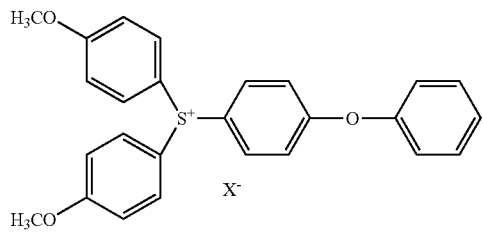

General Formula (11)

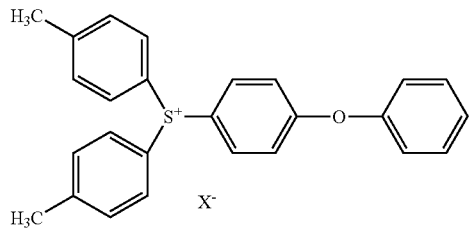

General Formula (12)

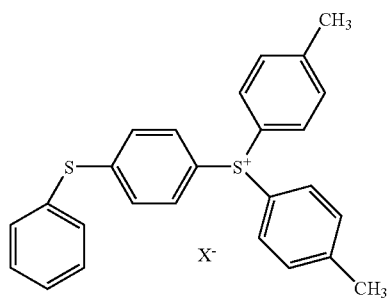

-continued

General Formula (13)

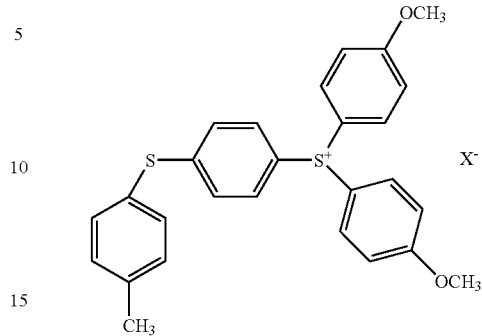

Other than those described above, it is possible to use various additives in the actinic radiation curable type ink composition of the present invention. It is possible to add, for example, surface active agents, leveling agents, matting agents, as well as polyester based resins, polyurethane based resins, vinyl based resins, acryl based resins, rubber based resins, and waxes, all of which control physical properties of the applied layers. Further, for the purpose of improving storage stability, it is possibly to use any of the basic compounds known in the art. Listed as the representative compounds are basic alkaline metal compounds, basic alkaline earth metal compounds, and basic organic compounds such as amines. Further, by combining radically polymerizable monomers with initiators, it is possible to prepare a radical-cation hybrid type ink.

In the actinic radiation curable type ink composition of the present invention, in order to achieve the desired curing property, it is preferable that the viscosity is 7-50 mPa·s at 25° C., since ejection is stabilized independently in a curing ambience (such as temperature and humidity).

EXAMPLES

The present invention will now be specifically described with reference to examples, but the embodiments of the present invention are not limited thereto.

Example 1

<<Control of δm Value>>

While stirring, phthalocyaninesufonic acid was added to purified water and mixed. Subsequently, untreated C.I. Pigment Blue 15:4 was added to the resulting solution and stirred for 30 minutes. The resulting mixture was filtered employing a suction funnel to collect solids. The collected solids were dried at 120° C. for two hours, whereby treated phthalocyanine pigment was prepared.

The concentration of phthalocyaninesufonic acid mixed solution was adjusted to vary the δm value.

<<Preparation of Pigment Dispersions>>

| (Preparation of Pigment Dispersion 1) | |
|---|---|
| Pigment | 10.0 weight parts |
| Dispersing agent (AJISPER PB822, polymer dispersing agent, manufactured by Ajinomoto Fine Techno Co., Inc.) | 1.5 weight parts |

(Preparation of Pigment Dispersion 1)

| | |
|---|---|
| Photopolymerizable compound: Aron Oxetane OXT-221 (oxetane compound, manufactured by TOAGOSEI Co., Ltd.) | 88.5 weight parts |

The above additives were mixed. Thereafter, the resulting mixture was dispersed for two hours employing a bead mill utilizing zirconia beads of a diameter of 0.5 mm, whereby Pigment Dispersion 1 was prepared.

(Preparation of Pigment Dispersions 2 and 3)

Pigment Dispersions 2 and 3 were prepared in the same manner as aforesaid Pigment Dispersion 1, except that pigments having different δm values were used.

(Preparation of Pigment Dispersion 4)

| | |
|---|---|
| Pigment | 7.0 weight parts |
| Dispersing agent: PLAAD ED-251 (pigment dispersing agent, Kusumoto Chemicals, Ltd.) | 2.8 weight parts |
| Photopolymerizable compound: VIKOFLEX 9010, epoxy compound, manufactured by ATOFINA Chemicals Inc.) | 90.2 weight parts |

The above additives were mixed. Thereafter, the resulting mixture was dispersed for two hours, employing a bead mill utilizing zirconia bead of a diameter of 0.5 mm, whereby Pigment Dispersion 4 was prepared.

(Preparation of Pigment Dispersions 5 and 6)

Pigment Dispersions 5 and 6 were prepared in the same manner as aforesaid Pigment Dispersion 4, except that pigments having different δm values were used.

(Preparation of Pigment Dispersions 7-11)

Pigment Dispersions 7-11 were prepared in the same manner as aforesaid Pigment Dispersion 1, except that pigments having different δm values were used.

<<Evaluations of Pigment Dispersions>>

With regard to Pigment Dispersion 1-11, prepared as above, the following measurements and evaluation were performed.

(Measurement of Hydrophilicity δm of the Pigment Surface)

Hydrophilicity δm of the surface of pigment particles in each pigment dispersion was determined employing the aforesaid titration method.

(Measurement of Viscosity)

Viscosity was determined at 25° C. under the condition of a share rate of 12 (l/s) employing a viscoelasticity measurement apparatus MCR300 (available from Nihon SiberHegner K.K.).

(Evaluation of Dispersibility: Observation of Coarse Pigment Particles)

Each of the pigment dispersions was applied onto a polyethylene terephthalate film to result in a wet coating thickness of 20 μm, employing a wire bar. The resulting coating was observed employing a hand magnifying lens (a magnification factor of 100) to detect any presence of coarse pigment particles.

(Evaluation of Dispersion Stability)

A specified amount of each of the pigment dispersions was placed in a centrifugation tube. Subsequently, centrifugation was performed for one hour under a condition of 1,600 G, employing a centrifuge. Thereafter, the resulting pigment dispersion was visually observed and dispersion stability was evaluated based on the criteria below.

A: no supernatant was noted

B: some supernatant was noted, but was at a commercially viable level

C: supernatant was clearly noted

Table 1 shows the results.

TABLE 1

| Pigment Dispersion No. | δm Value of Pigment Surface ($cal^{1/2} \cdot cm^{-1/2}$) | Viscosity (mPa·s) | Dispersibility (Coarse Grains) | Dispersion Stability | Remarks |
|---|---|---|---|---|---|
| 1 | 21.3 | 20 | not observed | A | Inv. |
| 2 | 20.9 | 20 | not observed | A | Inv. |
| 3 | 22.0 | 30 | not observed | B | Inv. |
| 4 | 21.3 | 45 | not observed | A | Inv. |
| 5 | 20.9 | 45 | not observed | A | Inv. |
| 6 | 22.0 | 55 | not observed | B | Inv. |
| 7 | 23.0 | at least 100 | observed | C | Comp. |
| 8 | 22.3 | 35 | not observed | C | Comp. |
| 9 | 22.6 | 40 | not observed | C | Comp. |
| 10 | 22.7 | 30 | not observed | C | Comp. |
| 11 | 22.7 | 30 | not observed | C | Comp. |

Inv.; Present Invention
Comp.; Comparative Example

As can clearly be seen from the results in Table 1, pigment dispersions of the present invention, which incorporated photopolymerizable compounds as well as pigments and exhibited a hydrophilicity δm of at most 22 $cal^{1/2} \cdot cm^{-1/2}$, exhibited excellent dispersibility and dispersion satability compared to the comparative examples. Example 2

<<Preparation of Ink Compositions>>

(Preparation of Ink Composition 1)

| | |
|---|---|
| Pigment Dispersion 1 | 40.0 weight parts |
| Photopolymerizable compound: Aron Oxetane OXT-221 (being an oxetane compound, manufactured by TOAGOSEI Co., Ltd.) | 27.9 weight parts |
| Photopolymerizable compound: Celloxide 2021P (being an epoxy compound, manufactured by Daicel Chemical Industries Co., Ltd.) | 27.1 weight parts |

-continued (Preparation of Ink Composition 1)

| | |
|---|---|
| Photopolymerization initiator: Adekaoptomer SP-152 (manufactured by Asahi Denka Kogyo K.K.) | 5.0 weight parts |

The above additives were mixed while stirring. Thereafter, the resulting mixture was filtered employing a membrane filter, whereby Ink Composition 1 was prepared.

(Preparation of Ink Composition 2)

Ink Composition 2 was prepared in the same manner as above Ink Composition 1, except that Pigment Dispersion 1 was replaced with Pigment Dispersion 2.

(Preparation of Ink Composition 3)

Ink Composition 3 was prepared in the same manner as above Ink Composition 1, except that Pigment Dispersion 1 was replaced with Pigment Dispersion 3.

(Preparation of Ink Composition 4)

| | |
|---|---|
| Pigment Dispersion 4 | 57.1 weight parts |
| Photopolymerizable compound: VIKOFLEX 9010 (being an epoxy compound, manufactured by ATOFINA Chemicals Inc.) | 37.9 weight parts |
| Photopolymerization initiator: Adekaoptomer SP-152 (manufactured by Asahi Denka Kogyo K.K.) | 5.0 weight parts |

The above additives were mixed while stirring. Thereafter, the resulting mixture was filtered employing a membrane filter, whereby Ink Composition 4 was prepared.

(Preparation of Ink Composition 5)

Ink Composition 5 was prepared in the same manner as above Ink Composition 4, except that Pigment Dispersion 4 was replaced with Pigment Dispersion 5.

(Preparation of Ink Composition 6)

Ink Composition 6 was prepared in the same manner as above Ink Composition 4, except that Pigment Dispersion 4 was replaced with Pigment Dispersion 6.

(Preparation of Ink Composition 7)

Ink Composition 7 was prepared in the same manner as above Ink Composition 1, except that Pigment Dispersion 1 was replaced with Pigment Dispersion 7.

(Preparation of Ink Composition 8)

Ink Composition 8 was prepared in the same manner as above Ink Composition 1, except that Pigment Dispersion 1 was replaced with Pigment Dispersion 8.

(Preparation of Ink Composition 9)

Ink Composition 9 was prepared in the same manner as above Ink Composition 1, except that Pigment Dispersion 1 was replaced with Pigment Dispersion 9.

(Preparation of Ink Composition 10)

Ink Composition 10 was prepared in the same manner as above Ink Composition 1, except that Pigment Dispersion 1 was replaced with Pigment Dispersion 10.

(Preparation of Ink Composition 11)

Ink Composition 11 was prepared in the same manner as above Ink Composition 1, except that Pigment Dispersion 1 was replaced with Pigment Dispersion 11.

<<Evaluation of Ink Compositions>>

With regard to Ink Compositions 1-11, employing the same methods as for Example 1, hydrophilicity δm of the pigment surface and viscosity were determined; dispersibility was evaluated; and coarse pigment particles were observed; and dispersion stability was evaluated. Table 2 shows the results.

TABLE 2

| Ink Composition No. | Pigment Dispersion No. | δm Value of Pigment Surface ($cal^{1/2} \cdot cm^{-1/2}$) | Viscosity (mPa·s) | Dispersibility (Coarse Particles) | Dispersion Stability | Remarks |
|---|---|---|---|---|---|---|
| 1 | 1 | 21.3 | 35 | not observed | A | Inv. |
| 2 | 2 | 20.9 | 35 | not observed | A | Inv. |
| 3 | 3 | 22.0 | 45 | not observed | B | Inv. |
| 4 | 4 | 21.3 | 45 | not observed | A | Inv. |
| 5 | 5 | 20.9 | 45 | not observed | A | Inv. |
| 6 | 6 | 22.0 | 55 | not observed | B | Inv. |
| 7 | 7 | 23.0 | 100 or more | observed | C | Comp. |
| 8 | 8 | 22.3 | 50 | not observed | C | Comp. |
| 9 | 9 | 22.6 | 55 | not observed | C | Comp. |
| 9 | 9 | 22.6 | 55 | not observed | C | Comp. |
| 10 | 10 | 22.7 | 45 | not observed | C | Comp. |
| 11 | 11 | 22.7 | 45 | not observed | C | Comp. |

Inv.; Present Invention
Comp.; Comparative Example

As can clearly be seen from the results in Table 2, the ink compositions of the present invention, which comprised photopolymerizable compounds, photopolymerization initiators, and pigments, and exhibited a hydrophilicity δm of the pigment surface of at most 22 $cal^{1/2} \cdot cm^{-1/2}$, exhibited excellent dispersibility as well as excellent dispersion stability compared to the comparative examples.

What is claimed is:

1. An ink jet recording method comprising steps of;
   ejecting microscopic ink droplets, and
   curing the ink by actinic radiation,
   wherein the ink contains a pigment dispersion comprising a photopolymerizable compound and a pigment, and hydrophilicity δm of surface of the pigment is at most 22 $cal^{1/2} \cdot cm^{-1/2}$, the pigment being subjected to a surface treatment so as to have hydrophilicity δm of at most 22 $cal^{1/2} \cdot cm^{-1/2}$,
   in which the hydrophilicity δm is determined based on the following method,
   the pigment is floated on a predetermined amount of water (B ml), and while stirring, acetone is introduced through a burette of which tip is placed in the water so that acetone is not directly poured onto the pigment, amount of the acetone (A ml) required to sink the pigment is recorded, and
   δm is calculated based on the formula, $\delta m = (A \cdot \delta_{acetone} + B \cdot \delta_{water})/(A+B)$ $\delta_{acetone} = 9.75\ cal^{1/2} \cdot cm^{-1/2}$ $\delta_{water} = 23.43\ cal^{1/2} \cdot cm^{-1/2}$.

2. The ink jet recording method of claim 1, wherein the photopolymerizable compound is a photopolymerizable compound containing an oxetane ring.

3. The ink jet recording method of claim 2, wherein the photopolymerizable compound is a photopolymerizable compound having 1-4 oxetane rings.

4. The ink jet recording method of claim 1, wherein the photopolymerizable compound is an epoxy compound.

5. The ink jet recording method of claim 4, wherein the epoxy compound is selected from an aromatic epoxide and an alicyclic epoxide.

6. The ink jet recording method of claim 5, wherein the dispersion comprises two or more epoxide compounds.

7. The ink jet recording method of claim 1, wherein the photopolymerizable compound is a vinyl ether compound.

8. The ink jet recording method of claim 7, wherein the vinyl ether compound is selected from a divinyl ether compound and a trivinyl ether compound.

9. The ink jet recording method of claim 7, wherein the dispersion comprises two or more vinyl ether compounds.

10. The ink jet recording method of claim 1, wherein the hydrophilicity δm is at most 21.5 $cal^{1/2} \cdot cm^{-1/2}$.

11. The ink jet recording method of claim 1, wherein the dispersion comprises a dispersing agent.

12. The ink jet recording method of claim 11, wherein the dispersing agent is a polymer dispersing agent.

13. The ink jet recording method of claim 1, wherein the surface treatment is a pigment derivative treatment, a rosin treatment, a polymer treatment, a surface graft treatment or a plasma treatment.

14. The ink jet recording method of claim 1, wherein the ink comprises a photopolymerization initiator.

15. The ink jet recording method of claim 14, wherein the photopolymerization initiator is an aromatic onium salt.

16. The ink jet recording method of claim 15, wherein the photopolymerization initiator is a sulfonium salt which generates no benzene by exposure to actinic radiation.

17. The ink jet recording method of claim 16, wherein the sulfonium salt is a sulfonium salt compound represented by following General Formulas (1)-(4), General Formula (1)

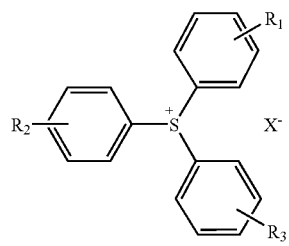

General Formula (2)

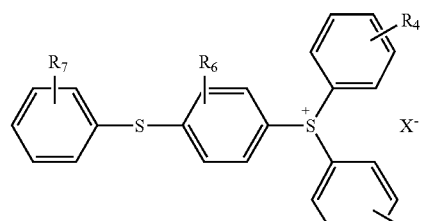

General Formula (3)

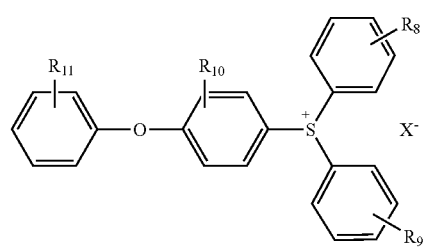

General Formula (4)

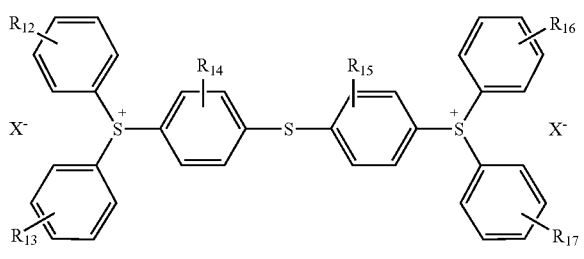

wherein $R_1$-$R_{17}$ each represent a hydrogen atom or a substituent, none of $R_1$-$R_3$ simultaneously represent a hydrogen atom, none of $R_4$-$R_7$ simultaneously represent a hydrogen atom, and none of $R_{12}$-$R_{17}$ simultaneously represent a hydrogen atom, and X represents a non-nucleophilic anionic residual group.

18. The ink jet recording method of claim 14, wherein the photopolymerizable compound is a photopolymerizable compound containing an oxetane ring.

19. The ink jet recording method of claim 18, wherein the photopolymerizable compound is a photopolymerizable compound having 1-4 oxetane rings.

20. The ink jet recording method of claim 14, wherein the photopolymerizable compound is an epoxy compound.

21. The ink jet recording method of claim 20, wherein the epoxy compound is selected from an aromatic epoxide and an alicyclic epoxide.

22. The ink jet recording method of claim 21, wherein the dispersion comprises two or more epoxide compounds.

23. The ink jet recording method of claim 14, wherein the photopolymerizable compound is a vinyl ether compound.

24. The ink jet recording method of claim 23, wherein the vinyl ether compound is selected from a divinyl ether compound and a trivinyl ether compound.

25. The ink jet recording method of claim 23, wherein the dispersion comprises two or more vinyl ether compounds.

26. The ink jet recording method of claim 14, wherein the hydrophilicity δm is at most 21.5 ($cal^{1/2} \cdot cm^{-1/2}$).

27. The ink jet recording method of claim 14, wherein the dispersion comprises a dispersing agent.

28. The ink jet recording method of claim 27, wherein the dispersing agent is a polymer dispersing agent.

29. The ink jet recording method of claim 14, wherein the surface treatment is a pigment derivative treatment, a rosin treatment, a polymer treatment, a surface graft treatment or a plasma treatment.

* * * * *